Aug. 31, 1948.   R. W. GILLESPIE   2,448,365
PROJECTOR AND RECEIVER OF SUPERSONIC FREQUENCIES
Filed July 27, 1945   3 Sheets-Sheet 1
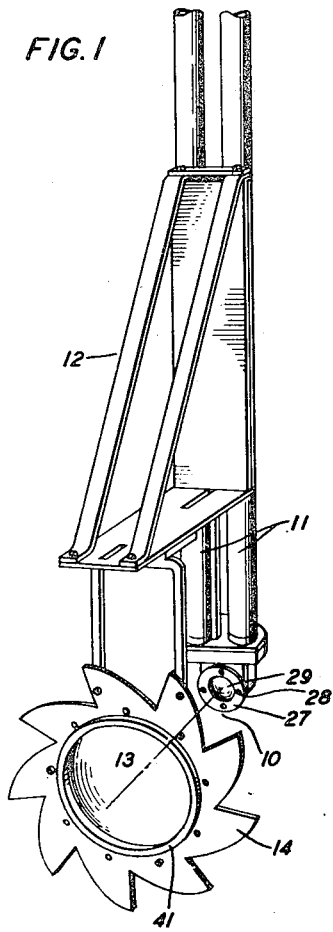
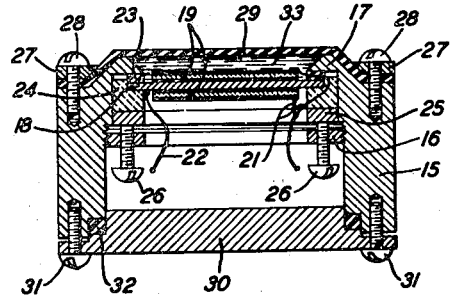
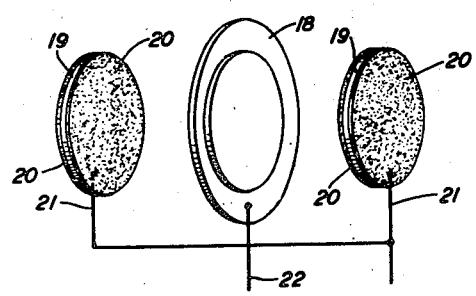
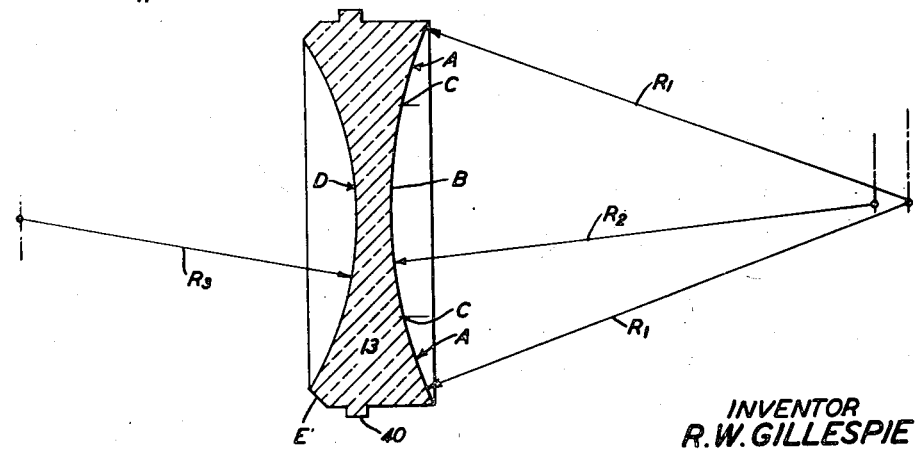
INVENTOR
R. W. GILLESPIE
BY
ATTORNEY Aug. 31, 1948.   R. W. GILLESPIE   2,448,365
PROJECTOR AND RECEIVER OF SUPERSONIC FREQUENCIES
Filed July 27, 1945   3 Sheets-Sheet 2

INVENTOR
R. W. GILLESPIE
BY
ATTORNEY

Patented Aug. 31, 1948

2,448,365

UNITED STATES PATENT OFFICE 2,448,365

PROJECTOR AND RECEIVER OF SUPERSONIC FREQUENCIES

Rollin W. Gillespie, New Providence, N. J., assignor to Bell Telephone Laboratories, Incorporated, New York, N. Y., a corporation of New York Application July 27, 1945, Serial No. 607,431

6 Claims. (Cl. 177—386)

This invention relates to underwater sound devices and more particularly to projectors and receivers of underwater signals especially suitable for operation at supersonic frequencies, specifically at frequencies above 100 kilocycles per second.

One object of this invention is to modify the directivity of underwater sound devices and more particularly to obtain sharp unidirectionality for supersonic transceivers of the piezoelectric crystal type.

Another object of this invention is to increase the signal strength at a prescribed point in the field of a supersonic underwater sound.

A further object of this invention is to modify diffraction effects in supersonic underwater sound devices embodying lenses.

In one illustrative embodiment of this invention, an underwater sound device especially suitable for the propagation and reception of signals of frequencies above 100 kilocycles per second comprises a transceiver including a piezoelectric crystal assembly mounted within a housing providing a path highly transparent to supersonic signals between the exterior and one face of the assembly and providing a second path highly opaque to such signals between the exterior and the other face and edge of the assembly, whereby the transceiver is unidirectional, and a supersonic lens mounted opposite the first-mentioned face of the assembly, the transceiver being mounted at one of the foci of the lens.

In accordance with one feature of this invention, the crystal assembly is constructed and arranged to possess in itself a highly directional characteristic. More specifically, in accordance with one feature of this invention, this assembly comprises a pair of substantially identical piezoelectric crystal discs, for example quartz discs vibratile in the thickness mode, affixed in alignment to opposite faces of a thin mounting disc, for example of steel, the crystal discs being of diameter large in comparison to the wavelength of the intended operating frequencies. The two crystal discs in conjunction with the mounting disc constitute a unitary assembly wherein dissymmetries due to the differences in the expansion coefficients of the crystal and mounting disc materials are substantially eliminated so that substantially piston-like vibration of the assembly, and particularly of the crystal disc opposite the sonically transparent portion of the housing, is obtained. Such vibration enhances the directional character of the assembly.

In accordance with another feature of this invention, means are provided in association with the lens for diffusing the diffraction pattern of compressional waves around the edge of the lens. More particularly, a ring is provided encompassing the lens, the ring having an irregular, e. g. serrated, periphery so that the diffraction pattern of the lens, acting as an obstacle, is scattered and the effects of the diffraction are substantially neutralized at one of the foci of the lens.

The invention and the above-noted and other features thereof will be understood more clearly and fully from the following detailed description with reference to the accompanying drawing in which:

Fig. 1 is a perspective view of an underwater signaling device illustrative of one embodiment of this invention;

Fig. 2 is a sectional view of a transceiver unit constructed in accordance with this invention, suitable for utilization in the device illustrated in Fig. 1;

Fig. 3 is an exploded perspective view of the crystal assembly included in the transceiver unit shown in Fig. 2;

Fig. 4 is a side sectional view of the supersonic lens included in the device shown in Fig. 1;

Figure 5:
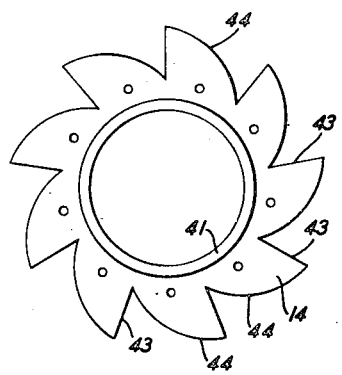
Fig. 5 is a plan view of the diffraction scattering ring associated with the lens in the device shown in Fig. 1.

Referring now to the drawing, the signaling device illustrated in Fig. 1 comprises a transceiver 10 mounted by a pair of rigid metallic tubes or pipes 11 which constitute grounded shields of coaxial conductors for the transceiver. Also mounted by the tubes or pipes 11, as by a framework or suspension 12, is a supersonic lens 13 encompassed by a serrated annulus 14.

The transceiver, in one construction shown in detail in Fig. 2, comprises a metal housing 15, for example of brass and affixed, as by soldering, to the tubes or pipes 11, having a locking ring 16 threaded thereinto and having also a chamfered flange 17 at one end thereof. Mounted within the housing is a crystal assembly, shown in detail in Fig. 3, comprising a metal, e. g. steel, mounting plate 18, having its outer portion of reduced thickness, and a pair of substantially identical piezo-electric discs 19 on opposite sides of the plate 18 and centrally aligned. The piezoelectric discs 19, for example of X-cut quartz are constructed to vibrate in the thickness mode and have electrically conductive coatings 20, for example of silver, upon the opposite faces thereof, one coating on each crystal being soldered to the respective face of the mounting plate 18. Leading-in wires 21, for example of thin metal foil, are connected to the other coatings 20 upon the crystals and to one inner conductor, not shown, of the coaxial lines aforementioned. The mounting plate 18 is connected to the other inner conductor by a suitable wire 22.

The two crystal discs 19 are operated in parallel electrically and are oriented to vibrate in phase when energized in accordance with signals applied by way of the conductors 21 and 22.

The periphery of the mounting plate 18 is interposed between an annular sealing gasket 23, such as of soft rubber, and an insulating ring 24, for example of a thermoplastic such as "lucite," the ring 24 being seated against a bearing ring 25. A plurality of screws 26 threaded through the locking member 16 bear against the bearing ring 25 and serve to lock the crystal assembly, together with the associated rings, against the flange 17 of the housing 15.

Overlying the flange 17 and secured to the housing by a clamping member 27 held in place by screws 28 is a closure 29 of a material highly transparent to supersonic compressional wave energy. One suitable material is a commercially available rubber, commonly referred to as ρc rubber, having substantially the same impedance as water for the transmission of compressional wave energy. The chamber 33, bounded by the crystal assembly, sealing ring 23, flange 17 and closure 29 is filled with a deaerated fluid, such as castor oil, also having substantially the same impedance as water for the transmission of supersonic compressional wave energy.

The housing is closed at the other end by a cover 30 affixed thereto by a plurality of screws 31, a rubber gasket 32 being provided to form a watertight seal.

It will be noted that one face of the crystal assembly, the upper face in Fig. 2, is in operative communication with the exterior by a path, through the liquid in the chamber 33 and the closure 29, having an impedance which matches very closely that of water so that efficient transmission of supersonic energy from this face of the crystal assembly to the medium, and vice versa, is attained. The other face of the crystal assembly, however, operates against an enclosed body of air the impedance of which differs greatly from that of water and from that of the crystal. Consequently, because of the impedance mismatch, very little energy is transmitted from this other face of the crystal assembly to the medium, and vice versa. Hence, the transceiver unit possesses a unidirectional response pattern.

The sharpness of the directional pattern is enhanced if the crystal diameter is made large in comparison to the wavelength of the intended operating frequency, or lowest intended operating frequency of the device. For example, in a device intended for operation throughout the band from 100 to 800 kilocycles, a crystal diameter of 3 centimeters has been found satisfactory.

Further, it has been found that the particular crystal disc and mounting plate assembly shown and described results in a very sharp directional pattern with weak diffraction rings due, it is believed, to the mechanical symmetry of the assembly as a vibrating system. The stress characteristics of metal, such as steel, used for the mounting plate 18, and of piezoelectric crystals, such as the quartz discs 19, are different. However, it will be appreciated that in the assembly disclosed, substantially equal and opposite bending forces due to differences in the stress coefficients of steel and quartz are created at the two metal to crystal interfaces. Consequently, the inequalities tend to cancel each other so that the vibration of the assembly is piston-like in character and distortion of the directional pattern occasioned by non-cophasic vibration of different areas of the front crystal disc is minimized.

Figure 9:
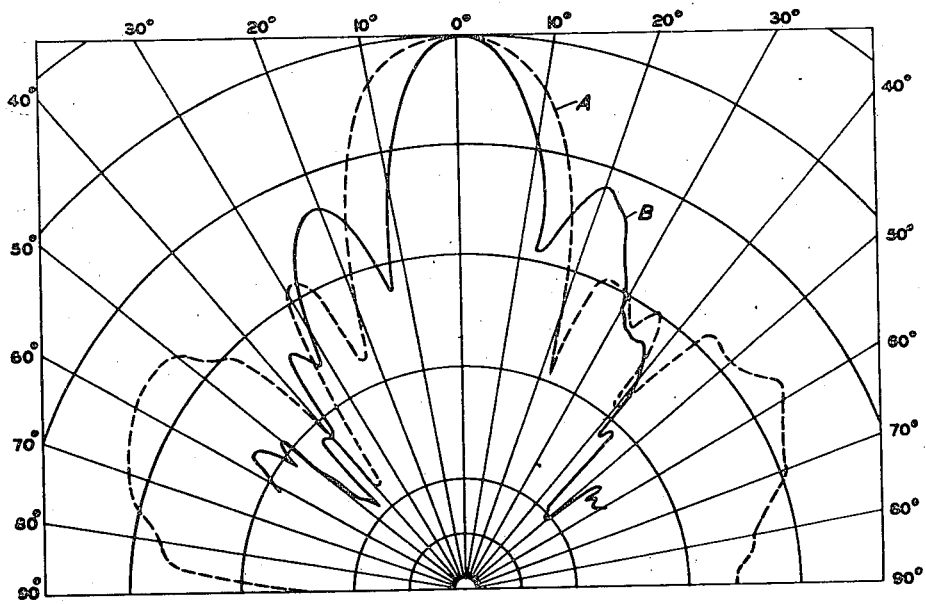
Fig. 9 shows typical directivity patterns for transceiver units of the construction shown in Fig. 2.

The crystal assembly is constructed, advantageously, so that the over-all thickness thereof is substantially equal to one-half wave-length of the operating frequency of the device or of the mid-frequency in the operating range in the case of wide-band operation. In a specific device, intended for operation in the band from 100 to 800 kilocycles, crystal discs 19 of quartz each .080 inch thick and a steel mounting plate 0.02 inch thick have been found satisfactory. Typical directivity patterns of such devices at 150 kilocycles and 750 kilocycles are shown by the graphs A and B, respectively, in Fig. 9.

Figure 6:
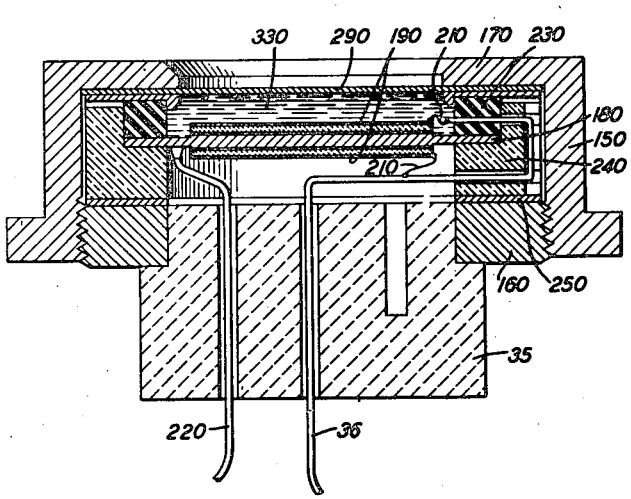
Fig. 6 is a sectional view of another transceiver unit, constructed in accordance with this invention, suitable for utilization in the device illustrated in Fig. 1.

The transceiver illustrated in Fig. 6 is similar to that shown in Fig. 2 and described hereinabove but is suitable for operation at higher frequencies and over a greater range of frequencies, for example in the band from 300 to 2200 kilocycles. The crystal and mounting plate assembly 180, 190 included therein is of the same construction as that described heretofore except that it is of smaller diameter; specifically the diameter of the crystal discs 190 in a transceiver intended to operate in the band from 300 to 2200 kilocycles may be 1 centimeter.

The assembly is mounted within the housing 150 between a rubber sealing ring 230 engaging the flange 170 of the housing, and an insulating annulus 240 which is locked in position, together with the crystal assembly, by the locking ring 160 threaded into the housing 150 and operating against the bearing ring 250. The front of the housing is closed by a thin metallic diaphragm 290, for example of 1.4 mil Phosphor bronze, affixed as by soldering to the inner face of the flange 170. The other end of the housing is closed by an insulating block 35, for example of "lucite" force fitted within the locking ring 160. A deaerated fluid, such as castor oil, filling is provided in the chamber 330. Electrical connection to the crystal assembly is established by way of conductors 220 and 36 extending through bores in the insulating block 35 and connected to the conductors, not shown, within the tubes or pipes 11. The entire unit may be mounted in a cup-shaped housing, not shown, affixed to the tubes 11, with the diaphragm 290 exposed.

As in the transceiver illustrated in Fig. 2, in the device shown in Fig. 6, the front face, i. e. the top face in the drawing, of the crystal assembly is coupled to the exterior by a path, through the diaphragm 290 and the body of fluid in the chamber 330, the impedance of which closely matches that of sea water, whereas the rear face operates into the air chamber between the crystal assembly and the block 35.

The crystal assembly is constructed to constitute a half wavelength vibratory system. In a specific construction suitable for utilization in the range noted above, 0.010 inch thick quartz discs 190 soldered to a steel disc 180, 0.015 inch thick have been found satisfactory.

The supersonic lens 13, in one construction illustrated in Fig. 4, is of the concentrating type and comprises a circular block, provided with an annular mounting flange 40, of a material, such as polystyrene, characterized by low absorption and reflection losses and a high index of refraction. The lens is mounted coaxially with the transceiver 10 in a metallic frame or ring 41 supported by the suspension 12.

In general, the supersonic lens may be designed in accordance with optical lens theory. Certain features and design criteria, however, may be noted. In a supersonic lens intended for operation in water, the lens thickness, of necessity is of the order of but one or several wavelengths. For example, 10 centimeters in water is equal to about 10 wavelengths at a frequency of 150 kilocycles. Hence, because of thin film effects, surface reflections at the lens should be avoided. This may be accomplished by the use of proper lens material and, further, by maintaining the angle of wave ray incidence substantially a right angle.

In order to correct for spherical aberration, one face of the lens, for example the front face, i. e. the right-hand face in Fig. 4, is provided with an outer portion A of greater radius of curvature, $R_1$, than that, $R_2$, of the central portion B. The line of division between the two portions A and B is indicated at C in Fig. 4. The other, or rear face of the lens, includes a concave portion D of constant radius of curvature, $R_3$, and an inclined or beveled portion E, the latter serving to block out any supersonic waves which might otherwise pass to the cylindrical wall of the lens before emerging from the front face. In order to prevent standing waves, coincidence of the conjugate foci and the respective centers of curvature of the lens faces should be avoided.

Dimensions of a polystyrene lens of the configuration shown in Fig. 4 and found particularly satisfactory for operation at the intended operating frequency of 150 kilocycles in conjunction with a transceiver, utilized as a projector, of the construction described hereinabove and mounted at the shorter focus of the lens are as follows:

Diameter of lens—110 millimeters
Diameter of face portion B—60 millimeters
Diameter of face portion D—100 millimeters
Radius of curvature of face portion A—145.5 millimeters
Radius of curvature of face portion B—136.5 millimeters
Radius of curvature of face portion D—95 millimeters
Conjugate foci—25 centimeters behind and 125 centimeters in front of lens
Thickness of lens at axis—10 millimeters
Angle of inclination of face portion E—45 degrees to lens axis.

The lens, as is apparent, acts as an obstacle in the path of the compressional waves and, therefore, due to diffraction of compressional waves around the edge thereof would produce upon the axis of the system a diffraction pattern superimposed upon the wave pattern due to the compressional waves transmitted through the lens. In order to prevent such effect, means are provided, in accordance with one feature of this invention, for breaking up or scattering the diffraction pattern. Specifically, a diffraction scattering member 14 is fixed to the mounting ring 41 and is formed of a material, such as thick brass, which constitutes a reflector of supersonic compressional wave energy and is provided with a serrated edge as shown clearly in Fig. 5 so as to destroy the axial diffraction pattern by interference.

The serrations are defined by radially extending straight edge portions 43 and spiral edge portions 44 and, for reasons which will be noted presently, an odd number of serrations are provided. The phase at any point on the axis, of diffracted waves, is determined by the distance from the wave source to the margin of the obstacle and thence to the point. Because of the configuration of the edge portions 44, the phase of waves arriving on the axis from points along each of these portions varies and, by proper design of these portions, can be made to vary continuously through 360 degrees at a prescribed point on the axis, e. g. at the focal point of the lens, at the desired operating frequency, and through a greater range of angles at higher frequencies. Consequently, at the prescribed point, the diffracted wave energy is substantially neutralized. The use of an odd number of serrations results in substantially complete neutralization and, because of the diametral dissymmetry of the diffraction scattering member, reinforcement of diffracted waves on the axis of the system is prevented.

An important operational advantage realized by the use of a lens constructed as described above is a substantial increase in the signal strength at the focus. For example, in a device of the construction illustrated in Fig. 1 and including a transceiver of the construction shown in Fig. 2, an increase of 8 decibels at 150 kilocycles in signal strength at the focus has been obtained; in such device including a transceiver of the construction illustrated in Fig. 6, an increase of 11 decibels at 150 kilocycles has been realized by the use of the lens.

Figure 7:
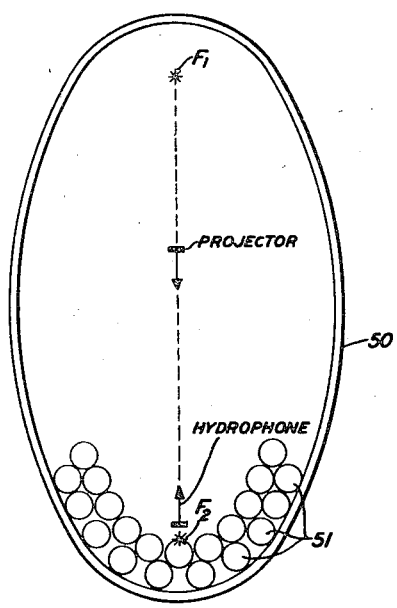
Fig. 7 is a plan view, partly diagrammatic, of apparatus suitable for use in the calibration of supersonic underwater signaling devices and embodying a device of the construction illustrated in Fig. 1.

Signaling devices of the constructions illustrated and described may be utilized to particular advantage in apparatus for the calibration of supersonic hydrophones and projectors. One such apparatus is illustrated in Fig. 7 and comprises a water-filled tank 50 of elliptical section and having foci at $F_1$ and $F_2$. A projector, which may be of the construction illustrated in Fig. 1, is mounted on the major transverse axis of the tank as indicated in Fig. 7 in alignment with the hydrophone to be calibrated. Conversely, if a projector is to be calibrated, the hydrophone employed may be of the construction illustrated in Fig. 1.

Figure 8:
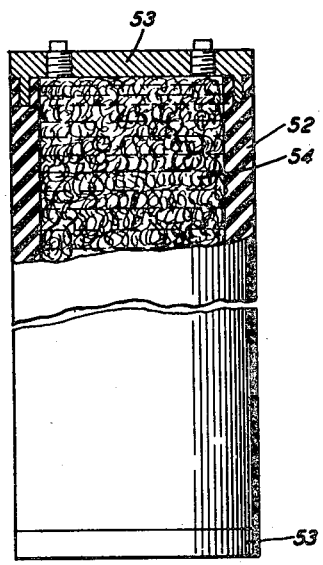
Fig. 8 is a sectional view of one of the energy absorbing units included in the apparatus shown in Fig. 7.

The hydrophone is mounted somewhat in front of the focus $F_2$ and the adjacent wall portions of the tank 50 have thereon a multiplicity of absorbing units 51 to substantially eliminate reflections of compressional waves therefrom and to suppress reverberation. Each of the units 51, as shown clearly in Fig. 8, comprises a housing having a cylindrical sheet 52 of a material, such as $\rho c$ rubber, highly transparent to supersonic compressional waves, and end closures 53, for example of brass, to which the sheet 52 is sealed, as by vulcanizing. The housing has therein a mass 54 of fibrous material, such as steel wool, and is filled with deaerated castor oil. Compressional waves passing through the transparent sheet 52 are highly attenuated in the steel wool-castor oil combination so that reflection of such waves from the wall portions of the tank 50 overlain by the absorbing units is prevented.

Although specific embodiments of this invention have been shown and described, it will be understood that they are but illustrative and that various modifications may be made therein without departing from the scope and spirit of this invention as defined in the appended claims.

What is claimed is:

1. A supersonic underwater signaling device comprising a housing, a mounting plate within said housing, a pair of piezoelectric discs affixed to opposite faces of said plate in face to face relation therewith and in alignment with each other, said discs being of a diameter large in comparison to the wavelength in water of the lowest intended operating frequency of the signaling device, means defining a path for the transmission of supersonic signals between one of said discs and the exterior of said housing, means for substantially preventing transmission of supersonic signals between the other of said discs and the exterior of said housing, a supersonic underwater signal lens opposite and in alignment with said one disc, and a shield opaque to supersonic signals encompassing said lens and extending outwardly from the periphery thereof, said opaque shield having an irregular periphery.

2. A supersonic underwater signaling device comprising a mounting plate, means supporting said plate for substantially free vibration in the direction of its thickness, a pair of similar piezoelectric crystal discs vibratile in the thickness mode affixed to opposite faces of said plate in face to face relation therewith and in alignment with each other, means defining a closed air chamber with one of said discs, means including a diaphragm transparent to supersonic underwater signals defining a second chamber with the other of said discs, and a fluid having substantially the same impedance as water for the transmission of supersonic underwater signals filling said second chamber.

3. A supersonic underwater signaling device comprising a supersonic underwater signal transceiver, a supersonic underwater signal lens opposite and in alignment with said transceiver, and an annulus opaque to supersonic underwater signals encompassing said lens and extending outwardly from the periphery thereof, said annulus having a serrated periphery.

4. A supersonic underwater signaling device in accordance with claim 3 wherein the periphery of said annulus is defined by alternately arranged linear, substantially radially extending, edge portions and spiral edge portions.

5. A supersonic underwater signaling device in accordance with claim 3 wherein the periphery of said annulus includes an odd number of substantially identical serrations.

6. In combination, a supersonic compressional wave lens, and a diffraction scattering member opaque to supersonic compressional waves encompassing said lens and extending outwardly from the periphery thereof, said member having an irregular periphery.

ROLLIN W. GILLESPIE.

REFERENCES CITED

The following references are of record in the file of this patent:

UNITED STATES PATENTS

| Number | Name | Date |
| --- | --- | --- |
| 1,471,547 | Chilowsky et al. | Oct. 23, 1923 |
| 1,472,558 | Fessenden et al. | Oct. 30, 1923 |
| 1,802,100 | Wolfe | Apr. 21, 1931 |
| 1,802,782 | Sawyer | Apr. 28, 1931 |
| 1,895,442 | Bowker | Jan. 31, 1933 |
| 2,086,891 | Bachman et al. | July 13, 1937 |
| 2,138,036 | Kunze | Nov. 29, 1938 |
| 2,283,285 | Pohlman | May 19, 1942 |
| 2,405,226 | Mason | Aug. 6, 1946 |

FOREIGN PATENTS

| Number | Country | Date |
| --- | --- | --- |
| 546,202 | Great Britain | July 2, 1942 |